United States Patent Office 3,759,896
Patented Sept. 18, 1973

3,759,896
PROCESS FOR MANUFACTURE OF POLYSACCHARIDES WITH ANTITUMOR ACTION
Nobuhiko Komatsu, 485 Tabata-cho, Kita-ku; Syoichi Kikumoto and Keitaro Kimura, both of 1, 6-chome, Yaesu, Chuo-ku; Sumio Sakai, 1–106 of 6, 3-chome, Yayoi-cho, Nakano-ku; Teruo Kamasuka, 1631 Gakuen Nishimachi, Kodaira-shi; and Yoshio Momoki, 31, 3-chome, Shimouma-cho, Setagaya-ku, all of Tokyo, Japan; Shoichi Takada, 967–3, Angyojirin; and Toshiyuki Yamamoto, 1700, 2-chome, Motogo-cho, both of Kawaguchi-shi, Saitama-ken, Japan; and Junichi Sugayama, 5–13, 3-chome, Sengen-cho, Kurume-machi, Kitatama-gun, Tokyo, Japan
No Drawing. Continuation-in-part of abandoned application Ser. No. 808,311, Mar. 18, 1969. This application June 10, 1971, Ser. No. 151,977
Claims priority, application Japan, Mar. 28, 1968, 43/19,712
Int. Cl. C07c 47/18
U.S. Cl. 260—209                             8 Claims

ABSTRACT OF THE DISCLOSURE

Process for manufacture of polysaccharides with antitumor action, mainly consisting of $\beta\text{-}(1\rightarrow 3)$-linked D-glucose residue.

This application is a continuation-in-part of application 808,311, filed Mar. 18, 1969, now abandoned.

BRIEF SUMMARY OF THE INVENTION

This invention relates to the process for manufacture of polysaccharides having antitumor action and mainly consisting of $\beta\text{-}(1\rightarrow 3)$-linked D-glucose residues.

This invention is a process for the production of a polysaccharide consisting mainly of $\beta\text{-}(1,3)$ linked D-glucoses, its derivatives and partially hydrolysed products, which comprises a procedure of obtaining the culture filtrate prepared by liquid culture of the fungi belonging to Ascomycetes, Basidiomycetes and Fungi imperfecti, the filtrate of the extract obtained by extracting the fruit bodies, sclerotia and mycelia of the said fungi with hot water, and the neutralizate of the alkaline extract thereof, and a procedure of purifying the said culture filtrate, the filtrate of the water extract and the neutralizate of the alkaline extract by the sequential treatments of the three essential steps described below: (1) acidification, (2) deionization by ion exchange resins and (3) precipitation with a water miscible organic solvent.

BACKGROUND OF THE INVENTION

U.S. Pat. No. 3,418,311, one of which inventors is Sakai, a member of the inventors of the present application, describes polysaccharide showing antitumor activity obtained from the plants belonging to Gramineae. But the yield of said polysaccharide was very poor and its quality varied within some range. And it showed the anti-tumor activity only when administered in a dose of above 50 mg./kg. intraperitoneally.

After energetic investigations, the inventors found that the effective principle is a glucan having specific structure and a glucan showing antitumor activity has been also obtained from many kinds of fungi in the present invention. The effective principle of the present invention is obtained in good yield and shows activity at doses of $\frac{1}{50}$ of that of the polysaccharide described in U.S. Pat. No. 3,418,311.

DETAILED DESCRIPTION

The fungi used in the present invention are selected from the following classes and orders.

(A) Ascomycetes
  Family Pyrenophoraceae in Order Sphaeriales.
  Families Bulgariaceae, Helvellaceae, and Pezizaceae in Order Pezizales.
(B) Basidiomycetes—Subclass Homobasidiae
  Families Tricholomataceae, Agaricaceae, Strophariaceae, Boletaceae, Russulaceae in Order Agaricales.
  Families Clavariaceae, Cantharellaceae, Corticiaceae, and Polyporaceae in Order Aphyllophorales.
  Order Phallales.
  Order Lycoperdales.
  Families Tremellaceae and Auriculariaceae in Subclass Heterobasidiae.
(C) Fungo imperfecti
  Dematiaceae in Order Moniliales.

These fungi grow well in usual culture media and produce the polysaccharide of this invention into the culture liquid. Glucose and sucrose are utilized as the carbon source. As the nitrogen source, inorganic nitrogen compounds such as sodium nitrate, ammonium sulfate, ammonium phosphate, and ammonium chloride, or organic nitrogen compounds such as urea and amino acids can be used. Addition of a small amount of magnesium salts and phosphates to the culture medium gives in good result, and a good result is also obtained by the addition of yeast extract, peptone, or thiamine. The desirable pH of the culture liquid is in the range of 3–6 and culture temperature should be around 25–30° C. Period of culture differs according to the kind of fungus used but it takes usually from 3 days to 3 weeks.

For extraction and purification of the effective substance from the culture liquid by the present invention, the culture mixture, after completion of incubation, is filtered or centrifuged to remove the mycelia, the culture filtrate so obtained, is concentrated under a reduced pressure and is acidified by adjusting the solution to pH 1–4 by the addition of an organic acid such as acetic, formic, succinic and trichloroacetic acid or an inorganic acid such as hydrochloric, sulfuric and phosphoric acid to discard protein, the precipitate formed is removed by filtration or centrifugation and the filtrate is passed through a column of a strongly acidic cation exchange resin and a column of a strongly basic anion exchange resin.

Strongly acidic cation exchange resin preferably employed in the present invention are Amberlite IR–120 and Amberlite IR–200 (Rohm and Haas Co., Ltd.), Dowex 50W (Dow Chemical Co., Ltd.), Duolite C–25 (Chemical Process Co., Ltd.) and so on. Strongly basic anion exchange resin preferably employed in the present invention are Amberlite IRA–400, Amberlite IRA–410 (Rohm and Haas Co., Ltd.), Dowex 1 (Dow Chemical Co., Ltd.) and Duolite A–40 (Chemical Process Co., Ltd.) and so on. The effluent or the non-dialysable solution is concentrated under a reduced pressure, and the concentrate is mixed with a water miscible organic solvent such as methanol, ethanol, n-propanol, iso-propanol or acetone in the concentration of the range 20–66% (by volume) and a precipitate is thereby obtained. The precipitated polysaccharide is washed with methanol three times and with ether once and dried. To extract the effective principle from the fruit bodies, sclerotia and mycelia, these are thoroughly stirred in water at the temperature in the range of 60–100° C. for 0.5–6 hrs. or 1–5 N alkaline aqueous solution at the temperature up to 50° C. for ½–24 hrs. If necessary, these fungal parts may be ground or homogenized to extract it more effectively. As an alkaline, sodium or potassium hydroxide is desirable. The alkaline extract is neutralized with a mineral acid such as hydrochloric, sulfuric or phosphoric acid and then purified using the procedures as described in the case of obtaining from culture filtrate. If necessary, the neutralizate is dialysed by using cellophane bags against running water to remove excess inorganic salt before it is passed through columns of ion exchange resins, and then the non-dialysate is passed through columns of ion exchange resins and purified using the procedures as described in the case of obtaining from culture filtrate. If the polysaccharide prepared by the process of the present invention are colored, it is dissolved in water and the solution is treated favorably with active carbon in stirring and heating.

The effective principle obtained by this invention is a white to greyish white, non-hygroscopic powder and a high-molecular substance that does not pass through a semipermeable membrane. It dissolves slowly in water but is insoluble in organic solvents in general. Its aqueous solution is neutral and is comparatively stable to acids, alkalis, and heat. Hydrolysis of this substance with acid and examination of its product by paper chromatography shows that its componental sugars consists mainly of glucose, so that it is essentially a glucan, but according to species, a small amount of xylase, mannose, and galactose are present. This substance shows the following color reactions: it gives positive Molische, Bial, Dubois, Dische, tryptophan-sulfuric acid and anthrone reactions, and negative Ninhydrin reaction. It gives also negative Fehling reaction and iodine-starch reaction.

The polysaccharide of the present invention undergoes a certain amount of hydrolysis when incubated with $\beta$-(1→3)-glucanase (Reese and Mandel, Can. J. Microbiol., 5, 173 (1959)) and is therefore assumed to be a glucan with $\beta$-(1→3)-linked D-glucose residues as the main chain. At the same time, presence of gentiobiose is often identified in the hydrolysate and so the presence of $\beta$-(1→6) side chains is also considered.

The methyl, acetyl, carboxymethyl, sulfuric acid, and phosphoric acid derivatives of this polysaccharide are produced by reacting the said original polysaccharide with methyliodide, monochloroacetic acid, acetic anhydride, sulfuric acid and phosphoric acid in an alkaline aqueous solution at a room temperature, and by dialysing the reactant against running water to remove impurity and to collect non-dialysable part, and by precipitation by adding a water miscible organic solvent such as above described to the non-dialysate.

Partially hydrolyzed products are obtained by incubating the said original polysaccharide with $\beta$-(1→3)-glucanase in an aqueous solution at the temperature in the range of 25–60° C. for ½–3 hrs., or by hydrolysis with an acid aqueous solution such as hydrochloric, sulfuric, phosphoric, formic, acetic and oxalic acid or an alkaline aqueous solution such as sodium, potassium and calcium hydroxide in the concentration up to 2 N at the temperature in a range of 50–100° C. for ½–6 hrs., and then by collecting the precipitate obtained by adding the water miscible organic solvent such as methanol, ethanol, n-propanol, iso-propanol and acetone to the incubate and the hydrolysate.

The antitumor action of the effective principle obtained by the present invention was examined by using solid form of sarcoma-180 in mice.

Several groups of mice, weighing about 20 g., were employed. Each group consisted of 10 mice, one group serving as a control without treatments. The animals in each group were transplanted with $5 \times 10^6$ cells of sarcoma-180 subcutaneously in the right groin. Treatment was carried out intraperitoneally once every other day for 10 days from 24 hrs. after the transplantation. After 25 days, the tumor was taken out and its average weight, average increase in body weight, inhibition ratio of tumor, number of regressed tumor, and mortality of the animals were examined. The results are shown in Table 1. It will be seen from this table that the substance of this invention administered in a dose of 2–15 mg./kg. possessed inhibition ratio of around 90% against the solid form of sarcoma-180, and the tumor was found to have regressed in the majority of animals.

TABLE 1

| Strain | Dose (mg./kg.) | Average body weight change (grams) | Mortality | Inhibition ratio (percent) | No. of regression (percent) |
|---|---|---|---|---|---|
| Experiment I: | | | | | |
| Control | 1 | 2.1 | 0/10 | | 0 |
| Cochliobolus sativas, C | 2 | 1.6 | 0/10 | 95 | 60 |
| Cochliobolus sativas, W | 2 | 1.8 | 0/10 | 90 | 50 |
| Cladosporium fluvum, A | 5 | 2.0 | 0/10 | 85 | 40 |
| Carboxymethyl pachyman | 25 | 1.9 | 0/9 | 82 | 33 |
| Sclerotinia sclerotiorum, A | 10 | 2.4 | 0/10 | 96 | 50 |
| Enzumatically degraded glucan prepared from Sclerotinia sclerotiorum, W | 2 | 1.9 | 0/10 | 84 | 40 |
| Experiment II: | | | | | |
| Control | | 2.3 | 0/10 | | 0 |
| Sclerotinia sclerotiorum, C | 5 | 2.0 | 0/10 | 95 | 50 |
| Sclerotinia sclerotiorum, A | 10 | 1.5 | 0/10 | 93 | 50 |
| Corticium centrifugum, A | 2 | 2.1 | 0/10 | 90 | 30 |
| Flammulina velutipes, W | 10 | 1.6 | 0/10 | 93 | 50 |
| Flammulina velutipes, A | 10 | 2.1 | 0/10 | 94 | 50 |
| Pholiota nameko, W | 5 | 2.6 | 0/10 | 80 | 30 |
| Pholiota nameko, A | 10 | 2.0 | 0/10 | 90 | 40 |
| Tricholoma aggregatum, A | 10 | 1.5 | 0/10 | 80 | 30 |

NOTE.—A=Alkali extract; C=Culture filtrate; W=Water extract.

Antitumor activity of the glucan prepared from the culture filtrate of *Flammulina velutipes* (Example 1) on several tumors other than sarcoma-180 is described below.

(a) Sarcoma-37

Ascites cells of sarcoma-37 were injected subcutaneously into the interscapular region of mice, in groups of 10 mice. The amount of tumor cells injected was approximately 2 million cells per mouse. Treatment and evaluation of the result were the same as in the case of sarcoma-180, and the results obtained are summarized in Table 2.

TABLE 2

| Dose (mg./kg.) | Average body weight change (grams) | Mortality | Tumor inhibition ratio (percent) | Rate of regression (percent) |
|---|---|---|---|---|
| 5 | +1.6 | 0/10 | 98 | 80 |
| 1 | +2.3 | 0/10 | 91 | 60 |
| Control | +6.4 | 0/10 | | 0 |

(b) Ehrlich carcinoma

The same experiment as for sarcoma-37 was carried out using Ehrlich carcinoma cells and the results are shown in Table 3. In this case, tumor injection was made through the intraperitoneal route.

TABLE 3

| Dose (mg./kg.) | Average body weight change (grams) | Mortality | Tumor inhibition ratio (percent) | Rate of regression (percent) |
|---|---|---|---|---|
| 5 | +1.8 | 0/10 | 96 | 70 |
| 1 | +2.3 | 0/10 | 79 | 60 |
| Control route IP | +3.5 | 0/10 | | 0 |

(c) Yoshida sarcoma

The same experiment as for sarcoma-37 was carried out using Yoshida sarcoma cells with Donryu rats, in groups of five rats. The results obtained are shown in Table 4.

TABLE 4

| Dose (mg./kg.) | Average body weight change (grams) | Mortality | Tumor inhibition ratio (percent) | Rate of regression (percent) |
|---|---|---|---|---|
| 5 | +28 | 0/5 | 85 | 50 |
| 1 | +25 | 0/5 | 73 | 30 |
| Control | +36 | 0/5 | | |

The data given in Tables 2, 3 and 4 show that the glucan tested has a significant inhibitory effect on tumor growth of sarcoma-37, Ehrlich carcinoma, and Yoshida sarcoma in a low dose, such as 1 or 5 mg./kg., without loss in average body weight or death of treated animals.

(d) Spontaneous mammary carcinoma in Swiss mice

Spontaneous mammary carcinoma in Swiss mice were extirpated, cut finely in physiological saline, and 0.25 ml. of its supernatant was inoculated subcutaneously in the same strain mice. The glucan was administered similarly as above from 24 hours after the inoculation and the result was judged 5 weeks later. This result is shown in Table 5.

TABLE 5

| Dose (mg./kg.) | Average body weight change (grams) | Mortality | Tumor inhibition ratio (percent) | Rate of regression (percent) |
|---|---|---|---|---|
| 10 | +3.8 | 0/7 | 49 | 0 |
| 5 | +4.5 | 0/7 | 31 | 0 |
| Control | +6.3 | 0/7 | | 0 |

(e) Methylcholanthrene-induced carcinoma in mice

Swiss mice were inoculated with 0.5 mg. of 3-methylcholanthrene dissolved in 0.1 ml. of olive oil, subcutaneously on scapular region. The tumor produced was extirpated, cut finely in physiological saline, and 0.1 ml. of this supernatant was inoculated in the same strain mice. Treatment and evaluation were the same as described in (a), and the result is given in Table 6.

TABLE 6

| | |
|---|---|
| Dose (mg./kg.) | 30 |
| Av. body weight change (percent) | +4.3 |
| Mortality | 0/6 |
| Tumor inhibition ratio (percent) | 58 |
| Rate of regression (percent) | 0 |

As shown in Tables 5 and 6, the glucan also showed an inhibitory action on tumor growth to a certain extent in spontaneous mammary carcinoma and methylcholanthrene-induced carcinoma transplanted in Swiss mice.

These antitumor spectra were obtained by the method usually used for evaluation of antitumor agents, and the antitumor action of the glucan may be considered to have been fully established.

Since the in vitro incubation of tumor cells for about three hours in highly concentrated aqueous solution of this polysaccharide does not destroy the tumor cells, this polysaccharide is different from the so-called cytotoxic anticancer agents used clinically which directly destroy the tumor cells, and is thought to produce some substance through an organ of the host animal and to increase resistance of host against the tumor specifically. In general, polysaccharides have a very low toxicity and one of the greatest features of the polysaccharide of this invention is that it has an extremely low toxicity.

Acute, subacute, and some pharmacological tests of the glucan obtained from culture medium of *Flammulina velutipes* were carried out.

Acute toxicity ($LD_{50}$) in mice was above 1000 mg./kg. by intraperitoneal administration, and concentrations above this dose was impossible to inject the solution of the glucan by increase of viscosity. Subacute toxicity was tested using rats for one and three months. Intraperitoneal administration of 1, 5, or 25 mg./kg., every day for one month, failed to show any difference between the medicated and control groups in the amount of diet ingested and changes in body weight. No difference was observed in urine test. In blood test, a slight increase in serum total protein was observed in the medicated group, and a tendency for increased serum transaminase activity and GOT value in the medicated group.

In pathohistological finding, hyperspleenism was observed in the groups given a 5 or 25 mg./kg. dose, and a slight increase in liver and kidney weight was found.

In histological findings, marked proliferation or activation of reticuloendothelial cells was observed in lymph glands, spleen, and liver. Though activation of the reticuloendothelial system was observed as described above, there was no indication of toxicity.

Subacute toxicity test for three months was carried out by the administration of the same doses as in the one month toxicity test (1, 5 and 25 mg./kg.), and changes found in the spleen and liver were the same as those found in the one-month subacute toxicity test, there being no evidence for new changes due to three months administration.

Various pharmacological activities of the glucan were then tested. Action on various excised organs was tested by the Magnus method, but no marked activity was observed, though a weak contraction of mouse ileum was observed in a dose of $10^{-3}$ g./ml. Intravenous administration of less than 10 mg./kg. failed to show any marked changes in rat and rabbit respiration and electrocardiographic results. In the test on blood pressure using rabbits, an intravenous injection of 10 mg./kg. of the glucan produced a slight fall.

As shown above, the glucan was found to be entirely free of toxicity in either subacute toxicity tests or in general pharmacological tests, and the substance is assumed to be quite safe.

Example 1

Five hundred milliliters of culture medium containing 3.0% of glucose, 0.3% of sodium nitrate, 0.1% of potassium dihydrogen phosphate, 0.05% of magnesium sulfate, 0.5% of potassium chloride, 0.1% of yeast-extract and 0.005% of ferric sulfate were divided into five flasks, and the flasks were sterilized at 120° C. for 15 minutes. The mycelium of *Flammulina velutipes* was inoculated in each flask and the flasks were incubated with shaking at 28° C. for 14 days. The mycelium was removed by filtration, the filtrate was concentrated under a reduced pressure to 180 ml., and the concentrate was acidified to pH 3.0 with hydrochloric acid. After being allowed to stand 2 hours, the precipitate formed was removed by filtration. The filtrate was passed through columns of Amberlite IR-120 and IRA-410 (Rohm and Haas Co.) and the effluent was concentrated under a reduced pressure to 150 ml. An equal volume of methanol was added to the concentrate, the precipitate formed was collected by centrifugation, washed twice each with methanol and ether, and dried to afford 1.8 g. of a white powder.

Example 2

*Corticium centrifugum* was inoculated in the same medium, 500 ml. of the culture broth was treated in the same manner as described in Example 1, and 2.4 g. of white powder was obtained.

Example 3

*Sclerotinia sclerotiorum* was inoculated in 1 l. of a medium containing 3% of sucrose, 0.1% of yeast extract, 0.3% of sodium nitrate, 0.1% of potassium dihydrogen phosphate, 0.05% of magnesium sulfate, and 0.05% of potassium chloride, and cultured for 7 days in the same manner as described in Example 1. The broth filtrate was concentrated under a reduced pressure to 250 ml. and the concentrate was acidified to pH 2.5 with phosphoric acid. After removing the precipitate by filtration, the filtrate was passed through columns of Duolite C-25 and Duolite A-40, and the effluent was concentrated to 210 ml. An equal volume of ethanol was added to the concentrate and mixed thoroughly. The precipitate formed was collected, dissolved in water, and ethanol was added again to the aqueous solution to yield 0.8 g. of a white powder.

Example 4

*Cochliobolus sativus* was inoculated and purified in the same manner as described in Example 3. From 1 l. of the culture medium, 0.7 g. of white powder was obtained by using isopropanol as an organic solvent in place of ethanol in Example 3.

Example 5

A mixture of 350 g. of commercially available fruit bodies of *Flammulina velutipes* in 3 l. of water was stirred in a homogenizer and heated at 80–100° C. for 3 hours with stirring. The mixture was allowed to cool, filtered, and 1.5 l. of water was added to the residue. The same extraction procedure was repeated. The filtrates were combined and concentrated under a reduced pressure. The concentrate was acidified to pH 4.0 with acetic acid and the precipitate formed was removed by filtration. The filtrate was passed through columns of Amberlite IR-120 and IRA-410, and the effluent was concentrated to 300 ml. To this concentrate, 600 ml. of methanol was added, the precipitate thereby formed was collected by centrifugation and washed with methanol and then with ether, affording 1.2 g. of white amorphous powder.

Example 6

In the same way as described in Example 5, 300 g. of commercially available fruit bodies of *Pholiota nameko* was extracted with boiling water, and the combined extract was concentrated to one-half the original volume. The concentrate was acidified to pH 3.0 with sulfuric acid, allowed to stand overnight, and the precipitate formed was removed by filtration. The filtrate was passed through columns of Duolite C-25 and A-40, and the effluent was concentrated to 900 ml. To this viscous concentrate was added 600 ml. of acetone, the precipitate formed was collected by centrifugation, and washed three times with acetone, affording 4.5 g. of a white amorphous powder.

Example 7

The wet mycelium (43 g.) of *Cochliobolus sativus* obtained in Example 4 was extracted with boiling water and purified in the same manner as described in Example 5. The powder obtained was dissolved in hot water and 0.5 g. of active carbon was added to the solution. The mixture was stirred in a water bath of 70–80° C. for 1 hr. and the active carbon was removed by filtration. The filtrate was concentrated and an equal volume of methanol was added to the concentrate. The precipitate formed was collected, washed several times with methanol, and dried to obtain 0.18 g. of white powder.

Example 8

Commercially available fruit bodies (200 g.) of *Flammulina velutipes* were shredded in a homogenizer with 1.2 l. of 2 N sodium hydroxide solution and the mixture was stirred at room temperature for 2 hr. The mixture was filtered. The residue was re-extracted with 0.8 l. of 2 N sodium hydroxide solution, and the extracts were combined. The combined extract was placed in a cellophane bag and dialyzed against running water for two days. The non-dialysable solution was adjusted to pH 4.0 with sulfuric acid and the precipitate formed was removed by filtration. The filtrate was passed through columns of Amberlite IR-120 and IRA-410, and the effluent was concentrated to 0.4 l. under a reduced pressure. An equal volume of isopropanol was added to the concentrate, the precipitate formed was collected by centrifugation and washed three times with acetone affording 2.8 g. of a white amorphous powder.

Example 9

The wet residue (200 g.) of *Pholiota nameko* in Example 6 was extracted with 1 N potassium hydroxide solution and purified in the same manner as described in Example 8. Duolite C-25 and A-40 were used for the treatment by ion exchange resins instead of Amberlites in Example 8. Methanol was used as an organic solvent for precipitation process and 3.1 g. of white powder was obtained.

Example 10

Commercially available fruit bodies (200 g.) of *Tricoloma aggregatum* was extracted with 3 N sodium hydroxide solution, and purified in the same manner as described in Example 8, and 2.4 g. of white powder was obtained.

Example 11

The wet mycelium (34 g.) of *Corticium centrifugum* obtained in Example 2 was extracted with 2 N potassium hydroxide solution and purified in the same manner as described in Example 8, affording 1.9 g. of a white amorphous powder.

Example 12

The wet mycelium (38 g.) of *Sclerotinia sclerotiorum* obtained in Example 3 was extracted with 3 N potassium hydroxide solution. The extract solution was neutralized with hydrochloric acid, placed in a cellophane bag for dialysis. The other purification processes were the same as described in Example 8 and 1.6 g. of white powder was obtained.

Example 13

*Cladosporium fluvum* was inoculated in 1 l. of the same medium as described in Example 3 and cultured for 10 days. Forty grams of wet mycelium obtained by filtration was extracted twice with 5 N sodium hydroxide at 10° C. for 24 hrs., the extract was purified in the same manner as described in Example 8 and 1.2 g. of white amorphous powder was obtained.

Example 14

To a solution of 0.5 g. of the polysaccharide, prepared from the culture broth of *Sclerotinia sclerotiorum* as described in Example 3, dissolved in 200 ml. of hot water, 5 mg. of $\beta$-(1→3)-glucanase, prepared by the method described by Reese and Mandel, was added and the mixture was incubated at 45° C. for 2 hr. The mixture was concentrated to 50 ml. under a reduced pressure, the concentrate was filtered, and an equal volume of ethanol was added with stirring into the filtrate. The precipitate formed was collected by centrifugation, washed three times with acetone, and 0.21 g. of a white powder was obtained.

Example 15

Ten grams of pachyman, prepared from commercially available hoelen which is a mycelium of *Poria cocos*, were dissolved in 130 ml. of 1 N sodium hydroxide solution. 6 g. of monochloroacetic acid was added in several portions to the solution with stirring at room temperature, and the mixture was then stirred for 1 hr. The mixture was then warmed and maintained at 50° C. for 3 hr. This was adjusted to pH 9 with acetic acid, the precipitate formed was filtered off, and the filtrate was dialyzed against running water for 2 days. The non-dialysable matter was concentrated to 450 ml. under a reduced pressure, two volumes of methanol was added to the concentrate, and 5.1 g. of the sodium salt of carboxymethylpachyman was obtained.

We claim:

1. A process for the production of a non-toxic, purified polysaccharide consisting mainly of $\beta$-(1,3) linked D-glucose residues which comprises
   (I) obtaining as the source of the said polysaccharide
      (a) the culture filtrate prepared from the liquid culture solution produced by incubation of the fungi selected from the group consisting of *Cochliobolus sativas, Sclerotinia sclerotiorum, Corticium centrifugun, Flammulina velutipes, Pholiota nameko, Tricholoma aggregatum, Poria cocos,* or *Cladosporium fluvum;* or
      (b) the filtrate of the extract prepared by extracting a member selected from the group consisting of fruit bodies, sclerotia, mycelia or a mixture thereof of the said fungi with hot water; or
      (c) the neutralizate prepared by adding a mineral acid to the filtrate of the extract produced by extracting a member selected from the group consisting of fruit bodies, sclerotia, mycelia and mixtures thereof of the said fungi with alkaline aqueous solution; and
   (II) purifying the said culture filtrate, the filtrate of the water extract or the neutralizate of the alkaline aqueous extract by the sequential treatments of the three essential steps comprising:
      (1) acidifying the culture filtrate, the filtrate of the extract with hot water or the neutralizate of the alkaline aqueous extract to a pH in the range of 1–4 with a mineral acid or an organic acid and discarding the precipitate formed to obtain a solution;
      (2) deionizing the solution by passage through a column of a strongly acidic cation exchange resin and a strongly basic anion exchange resin and collecting the effluent; and
      (3) precipitating by adding a water miscible organic solvent to the concentrate of the said effluent in a concentration of 20–66% by volume and collecting said polysaccharide as the precipitate.

2. A process for the production of methyl and carboxymethyl ethers of a polysaccharide, acetyl, sulfuric and phosphoric acid esters of a polysaccharide and partially hydrolyzed products of a polysaccharide consisting mainly of $\beta$-(1,3) linked D-glucose residues comprising converting the polysaccharide produced by the process of claim 1 by reacting said polysaccharide with methyliodide, monochloroacetic acid, acetic anhydride, sulfuric and phosphoric acid, respectively or by converting said polysaccharide to a partially hydrolyzed product.

3. A process according to claim 2, wherein a partially hydrolyzed product is produced
   by incubating said polysaccharide with $\beta$-(1→3)-glucanase in an aqueous solution at a temperature in the range of 25–60° C. for 0.5–3 hours to form an incubate; or
   by hydrolysis with an acid selected from the group consisting of sulfuric, phosphoric, formic, acetic and oxalic acid or an alkaline hydroxide selected from the group consisting of sodium, potassium and calcium hydroxide in a concentration up to 2 N at a temperature of 50–100° C. for 0.5–6 hours to form a hydrolyzate; and
   by adding a water miscible organic solvent selected from the group consisting of methanol, ethanol, n-propanol, iso-propanol and acetone to said incubate or said hydrolyzate to obtain said partially hydrolyzed product as a precipitate.

4. A process according to claim 1, wherein the culture filtrate is obtained by incubating the said fungi in a liquid medium consisting of glucose, sodium nitrate, sucrose, ammonium sulfate, ammonium phosphate, ammonium chloride, urea, aminoacids, a minor amount of magnesium salts, phosphates, yeast extract, peptone or thiamine with a pH range of 3–6 at a temperature of the range of 25–30° C. for from 3 days to 3 weeks.

5. A process according to claim 1, wherein the hot water extraction step is carried out at a temperature in the range of 60–100° C. for 0.5–6 hrs.

6. A process according to claim 1, wherein the alkaline extraction step is carried out with a 1 N–5 aqueous solution of sodium or potassium hydroxide at a room temperature of up to 50° C. for 0.5–24 hrs.

7. A process according to claim 1, wherein the mineral acids are hydrochloric, sulfuric and phosphoric acid, and the organic acids are acetic, formic, succinic and trichloroacetic acid.

8. A process according to claim 1, wherein the water miscible organic solvents are methanol, ethanol, n-propanol, iso-propanol and acetone.

References Cited

UNITED STATES PATENTS 3,301,848  1/1967  Halleck _____ 260—209 R
3,418,311  12/1968  Sakai et al. _____ 260—209 R

FOREIGN PATENTS

Bessey: "Morphology and Taxonomy of Fungi"; pp. 251–4; 1950; published, Blakiston Co.

A. LOUIS MONACELL, Primary Examiner

T. G. WISEMAN, Assistant Examiner

U.S. Cl. X.R.

195—31 P